(12) United States Patent
Wang et al.

(10) Patent No.: US 11,693,197 B2
(45) Date of Patent: Jul. 4, 2023

(54) FIXTURE AND METHOD FOR ATTACHING FIBERS TO V-GROOVES OF PHOTONIC INTEGRATED CIRCUIT

(71) Applicant: Google LLC, Mountain View, CA (US)

(72) Inventors: Daoyi Wang, San Jose, CA (US); Ryohei Urata, San Carlos, CA (US); Lieven Verslegers, Redwood City, CA (US); Jan Petykiewicz, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 82 days.

(21) Appl. No.: 17/358,314

(22) Filed: Jun. 25, 2021

(65) Prior Publication Data
US 2022/0413234 A1    Dec. 29, 2022

(51) Int. Cl.
G02B 6/42     (2006.01)
G02B 6/12     (2006.01)
G02B 6/30     (2006.01)

(52) U.S. Cl.
CPC .............. *G02B 6/4242* (2013.01); *G02B 6/12* (2013.01); *G02B 6/30* (2013.01); *G02B 6/423* (2013.01); *G02B 6/4249* (2013.01)

(58) Field of Classification Search
CPC .......... G02B 6/30; G02B 6/4249; G02B 6/42
See application file for complete search history.

(56) References Cited

U.S. PATENT DOCUMENTS

| | | |
|---|---|---|
| 4,756,590 A | 7/1988 | Forrest et al. |
| 5,071,213 A | 12/1991 | Chan |
| 5,182,789 A | 1/1993 | Nash-Stevenson et al. |
| 5,466,558 A | 11/1995 | Sasaki |
| 6,438,297 B1 | 8/2002 | McKenzie |
| 7,321,708 B2 | 1/2008 | Jenkins et al. |
| 9,316,796 B2 | 4/2016 | Barwicz et al. |
| 9,400,356 B2 | 7/2016 | Barwicz et al. |
| 9,568,682 B1 | 2/2017 | Barwicz et al. |
| 9,632,262 B2 | 4/2017 | Aihara et al. |
| 9,817,192 B2* | 11/2017 | Nekado ................. G02B 6/325 |
| 10,527,806 B2 | 1/2020 | Butler et al. |
| 10,775,568 B2 | 9/2020 | Barwicz et al. |
| 11,125,947 B1* | 9/2021 | Zhao .................... G02B 6/3652 |
| 2003/0138223 A1 | 7/2003 | Sasaki et al. |
| 2004/0067025 A1 | 4/2004 | Haraguchi et al. |

(Continued)

FOREIGN PATENT DOCUMENTS

JP     2018110224 A     7/2018

OTHER PUBLICATIONS

International Search Report and Written Opinion for International Application No. PCT/US2022/029545 dated Oct. 21, 2022. 13 pages.

*Primary Examiner* — Tina M Wong
(74) *Attorney, Agent, or Firm* — Lerner David LLP (57) ABSTRACT

A system for passive alignment of fibers to an interface of a photonic integrated circuit (PIC) includes an input frame, an actuator, and an output frame. The actuator arranged to apply force along a force axis to the input frame. The output frame including a tip for picking up a plate and transferring the force thereto, the output frame being connected to the input frame such that the output frame may tilt relative to the input frame and the output frame is elastically biased relative to the input frame into a position wherein the tip is aligned on the force axis.

20 Claims, 8 Drawing Sheets

(56) References Cited

U.S. PATENT DOCUMENTS

| | | |
|---|---|---|
| 2007/0272727 A1 | 11/2007 | Yang |
| 2007/0280620 A1 | 12/2007 | Matsuda et al. |
| 2013/0207127 A1 | 8/2013 | Yu et al. |
| 2017/0075082 A1* | 3/2017 | Aihara .................. G02B 6/325 |
| 2022/0413234 A1* | 12/2022 | Wang .................. G02B 6/4249 |

* cited by examiner

FIXTURE AND METHOD FOR ATTACHING FIBERS TO V-GROOVES OF PHOTONIC INTEGRATED CIRCUIT

BACKGROUND

Photonic integrated circuits (PIC's) may include an input-output (I/O) interface in the form of V-grooves into which optical fibers are received. The manufacture of PIC-based electronics and network hardware may therefore involve placement and fixation of the fibers of an optical cable into the V-grooves of PIC's. Active attachment methods of manufacture involve careful, precise alignment of the fibers with the I/O interface. Passive attachment involves stripping an optical ribbon to present fibers with spacing approximately matching the spacing of the V-grooves, coarsely aligning the entire ribbon with the I/O interface, then pressing a lid or spacer onto the exposed fibers to force them into the V-grooves.

In passive attachment, the inclined surfaces defining the V-grooves can guide the fibers into place, thus compensating for imprecision in the coarse alignment, but causing all of the fibers to deflect and set into a proper seating requires significant force. Thus, while known passive attachment methods can make slight lateral misalignment of the ribbon relative to the V-grooves tolerable, problems including inconsistent seating across multiple fibers can result when the plane of the I/O interface is not arranged to extend perfectly normal to the direction of the pressing force. Moreover, lids or spacers made of relatively soft material like plastics, can fail to effectively transfer the pressing force to all fibers and become damaged during pressing.

BRIEF SUMMARY

Aspects of this disclosure are directed to a passive attachment system. The alignment system may include a tip, such as a vacuum tip for lifting a plate and applying a vacuum force to the plate, and a carriage or jig for transferring a pressing force to the tip. The jig may include an input frame, upon which the pressing force may exerted, and an output frame from which the tip may extend. The input frame may be coupled to the output frame by one or more elastic biasing elements that may allow the output frame to tilt relative to the input frame while the jig presses the plate down on the fibers and PIC.

The one or more biasing elements may enable the output frame to tilt relative to the input frame toward any one direction within a range of up to 360° around an axis of the pressing force exerted upon the input frame. The one or more biasing elements may be, for example, one large spring, such as a coil spring, disposed between the input frame and output frame at a location centered over the tip and on the axis of the pressing force upon the input frame or, in other examples, multiple springs of any type disposed between the input frame and the output frame at different angular locations around the axis of the pressing force upon the input frame. In one specific example, four coil springs of equal resilience may be disposed between the input frame and output frame at locations radially equidistant from the axis of the input force upon the input frame and evenly angularly spaced from one another.

The plate may be made of glass. Curing radiation may be transmitted through the plate after the fibers are seated in the V-grooves and while pressure upon the lid is maintained. Light-curable adhesive, such as epoxy, may be applied to either or both of the I/O interface and the fibers themselves before the pressing step and cured during or after the pressing step. The tip may be glass as well so that the curing light may be projected through the tip. Example glasses suitable for the lid and tip include quartz, Pyrex, and borosilicate glass. After the adhesive is cured, the load may be removed from the lid.

In another aspect, a system for passive alignment of fibers to an interface of a photonic integrated circuit (PIC) may comprise an input frame, an actuator, and an output frame. The actuator may be arranged to apply force along a force axis to the input frame. The output frame may include a tip for picking up a plate and transferring the force thereto. The output frame may be connected to the input frame such that the output frame may tilt relative to the input frame and the output frame is elastically biased relative to the input frame into a position wherein the tip is aligned on the force axis.

In another arrangement according to any of the foregoing, the system may include a vacuum assembly configured to evacuate air from a tube having an opening at an end of the tip.

In another arrangement according to any of the foregoing, the system may include a spring connecting the input frame to the output frame.

In another arrangement according to any of the foregoing, the system may include a plurality of springs connecting the input frame to the output frame, wherein each spring is positioned at a different respective position about the force axis.

In another arrangement according to any of the foregoing, the plurality of springs may be balanced with regard to the resilience and placement of each spring such that the bias between the input frame and output frame is symmetrical about the force axis.

In another arrangement according to any of the foregoing, each spring of the plurality of springs may be located at an equal radial distance from the force axis and an equal angular distance on either side from each circumferentially adjacent spring.

In another arrangement according to any of the foregoing, the plurality of springs may be four springs, each of the four springs defining a corner of a square arrangement centered on the force axis.

In another arrangement according to any of the foregoing, the tip may extend along the force axis.

In another arrangement according to any of the foregoing, the tip may transparent.

In another arrangement according to any of the foregoing, the output frame may be free to tilt away from the position wherein the tip is aligned on the force axis in any one direction across a 360° degree range relative to the force axis.

In another arrangement according to any of the foregoing, the system may comprise a gantry carrying the input frame, actuator, and output frame at a movable location.

In another aspect, a method of coupling an optical cable to a PIC may comprise coarsely aligning exposed fibers of the cable with V-grooves of an in-out (I/O) interface of the PIC, aligning a plate over the exposed fibers and the I/O interface and applying force along a force axis to a jig, the jig being arranged to transfer the force to the plate, until each of the fibers is seated in a respective V-groove. The jig may comprise an input frame to which the force is applied, and an output frame. The output frame may include a tip extending therefrom for transferring the force to the plate, the output frame being free to tilt relative to the input frame and resiliently biased relative to the input frame toward a position wherein the tip extends along the force axis of the force and the output frame is spaced relative to the input frame.

In another arrangement according to any of the foregoing, the method may comprise using a vacuum to secure the PIC to a base before the step of applying force along the force axis.

In another arrangement according to any of the foregoing, the method may comprise using a vacuum connected to the tip to pick up the plate.

In another arrangement according to any of the foregoing, the method may comprise applying adhesive to either or both of the I/O interface and the fibers before the step of applying force.

In another arrangement according to any of the foregoing, the method may comprise curing the adhesive with light projected through the plate after each of the fibers is seated in a respective V-groove.

In another arrangement according to any of the foregoing, the light may also be projected through the tip.

In another arrangement according to any of the foregoing, the output frame may be free to tilt away from the position wherein the tip is aligned on the force axis in any direction across a 360° degree range relative to the force axis.

In another arrangement according to any of the foregoing, the step of aligning the plate may include controlling a gantry to move the jig while the plate is retained by the tip of the jig.

In another arrangement according to any of the foregoing, the method may comprise a cleaving step prior to the coarse alignment step, the cleaving step including providing the exposed fibers by removing cladding from an end of the cable until each of the exposed fibers has a length at least five times a length of the V-grooves.

DETAILED DESCRIPTION

Figure 1A:
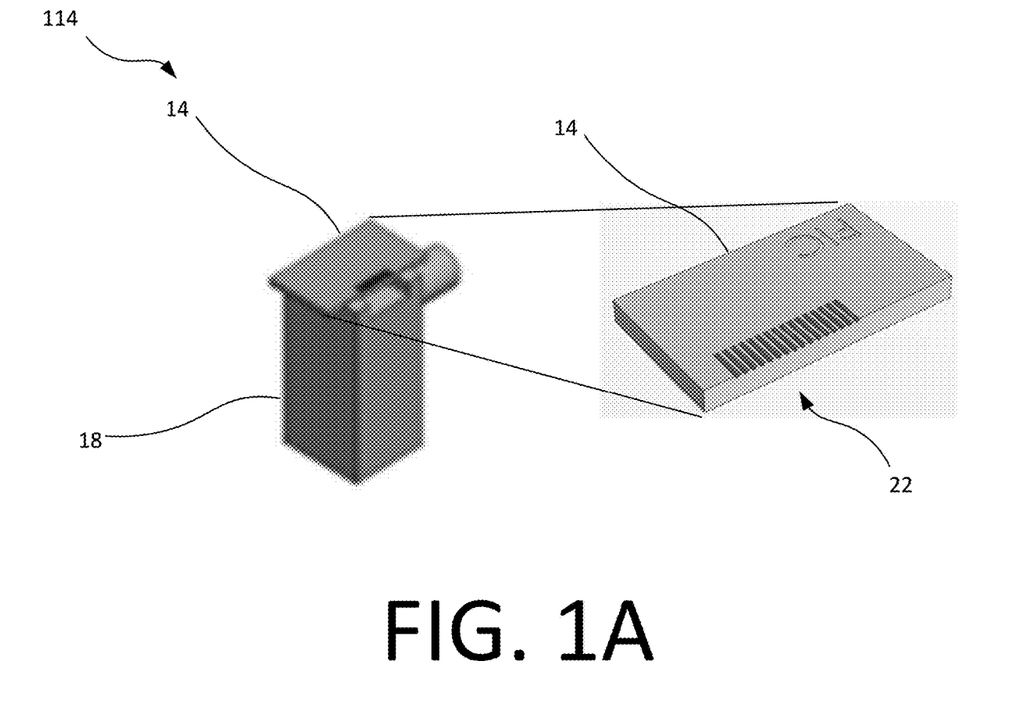
FIG. 1A is an oblique perspective view of a photonic integrated circuit (PIC) on a support.
Figure 1B:
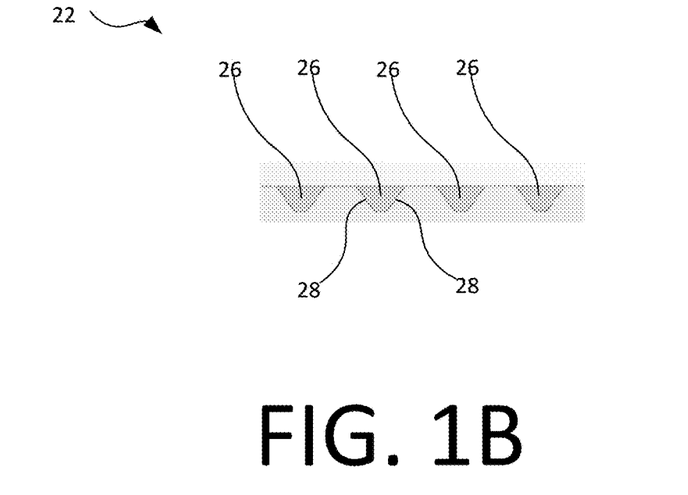
FIG. 1B is an elevation view of a portion of an input/output (I/O) interface of the PIC of FIG. 1A.

FIG. 1A illustrates a supporting step 114 in which a photonic integrated circuit (PIC) 14 is placed upon a support 18. PIC 14 includes an input/output (I/O) interface 22. As shown in FIG. 1B, I/O interface 22 includes several V-grooves 26. Each V-groove 26 includes two opposed side walls 26 that slope toward each other from a relatively wide top of the V-groove to a relatively narrow bottom of the V-groove. Each opposed pair of side walls 28 thus has an overall shape similar to the letter "V."

Figure 2A:
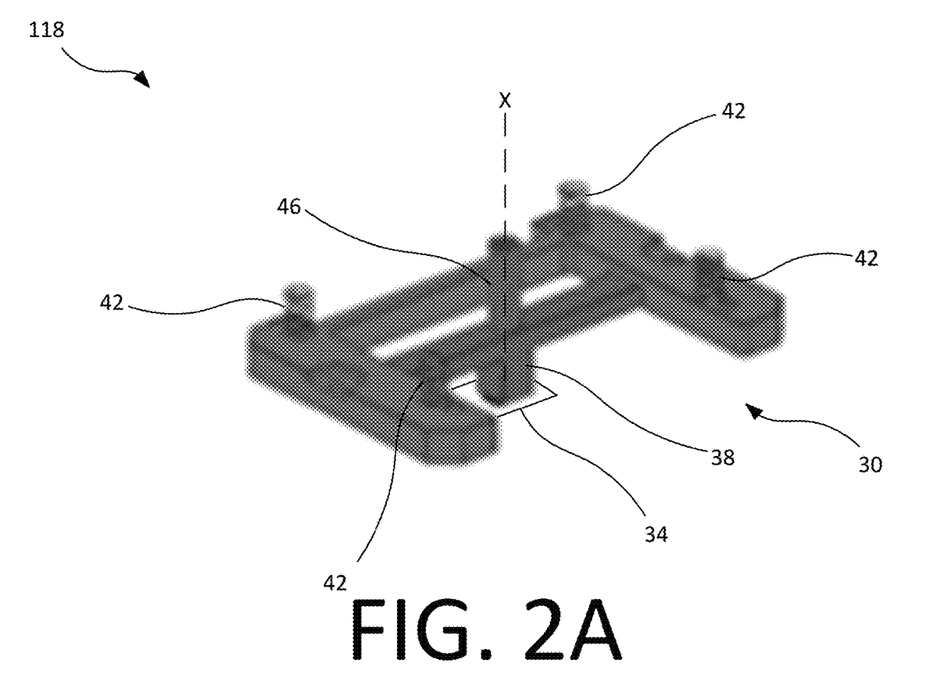
FIG. 2A illustrates a step of picking up a lid with an output frame.

FIG. 2A illustrates a picking step 118 in which a lid 34 is picked up by a tip 38. Lid 34 of the illustrated example is a plate that may be made of any material hard enough to press fibers into V-grooves 26 according to the processes described in this disclosure. In some examples, lid 34 may be bound to certain adhesives that can also bind PIC 14 and optical fibers. In further examples, lid 34 is transparent to some visible light, ultraviolet light, or at least some wavelengths of electromagnetic radiation. Specific examples of suitable materials from which lid 34 may be formed include glass, such as quartz, Pyrex, and borosilicate glass, or polymer plastics such as acrylics.

Tip 38 may be made of any of the materials of which lid 34 may be made. Picking step may be performed before, after, or during supporting step 114. In some examples, tip 38 is made of a material that is at least as hard as the material of which lid 34 is made. In the illustrated example, an enclosed channel extends through tip 38 to an opening at an end of the tip (not visible in FIG. 2A), and a hose 46 is connected to an opposite end of the channel from the opening. The hose 46 may thus be used to evacuate the channel and create suction through the opening of the tip 38 by which lid 38 may be picked up. However, in alternative examples, tip 38 includes any known apparatus or combination of apparatus capable of both lifting and carrying lid 34 and applying force to the lid along a force axis X.

Figure 2B:
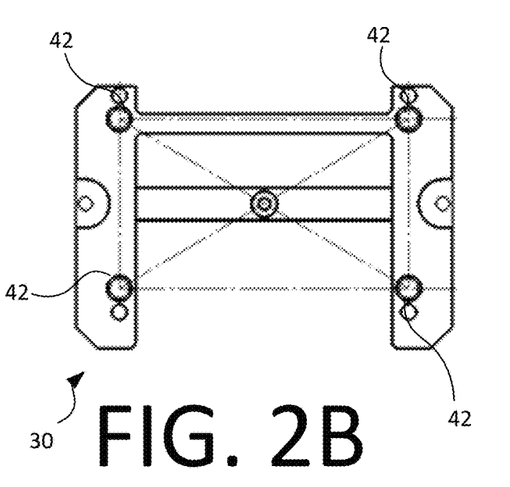
FIG. 2B is a top plan view of the output frame of FIG. 2A.
Figure 2C:
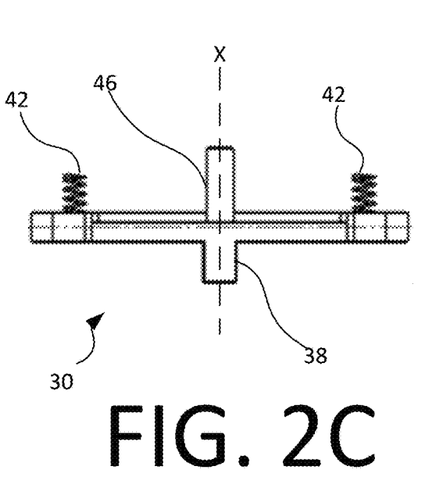
FIG. 2C is a front elevation view of the output frame of FIG. 2A.

Turning to FIGS. 2B and 2C, with continued reference to FIG. 2A, tip 38 is part of an output frame 30. In the illustrated example, four coil springs 42 are distributed in a plane orthogonal to the force axis X. In the example of FIG. 2B, the springs 42 are arranged in a symmetrical arrangement and at equal distances from force axis X, although in other arrangements the springs may be symmetrical and at different distances or even non-symmetrical. Throughout this disclosure, the terms "upward" and "downward" are defined relative to the perspective of FIG. 2C, though processes according to this disclosure may be performed such that the actual directions of upwards and downwards correspond to the use of such terms herein. Tip 38 extends away from its point of connection to the rest of output frame 30 in a downward direction along force axis X, and coil springs 42 extend upward away from their points of contact with the output frame. Thus, application of downward force to each spring 42 will drive output frame 30 downward, though the elastic nature of the springs will enable the output frame to tilt relative to force axis X while such force is applied. Further, downward force on springs 42 will bias output frame 30 toward alignment of tip 38 along force axis X.

However, the illustrated arrangement of four coil springs 42 is merely one example of an arrangement for biasing output frame 30 suitable for processes according to the present disclosure. Other examples of suitable biasing arrangements include a single large coil spring centered on force axis X, or any number of springs of any type in a symmetrical arrangement around the force axis. Downward force upon biasing arrangements according to any of these examples will force output frame 30 downward and bias the output frame toward alignment of tip 38 along force axis X while allowing the output frame to tilt relative to the force axis X.

Figure 3A:
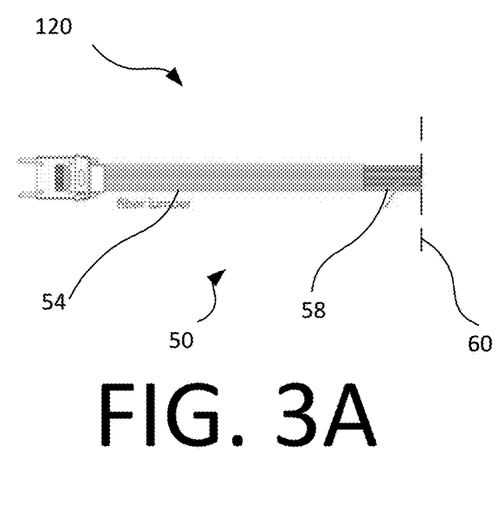
FIG. 3A is an oblique perspective view of a cleaved, partially stripped optical jumper cable.

FIG. 3A illustrates an example of a result of a cleaving step 120 performed upon an optical fiber jumper cable 50. In other examples, cleaving step 120 may be performed upon any component including a ribbon of optical fibers 58. Cleaving step may be performed before, after, or during either or both of supporting step 114 and picking step 118. In cleaving step 120, cladding 54 is cut back to reveal exposed fibers 58, and the exposed fibers are cut such that their length relative to one another is suitable for effective seating within I/O interface 22. In the illustrated example, exposed fibers 58 are cut such that their free ends are each located at a respective point along a common line 60 extending perpendicular to the fibers themselves. However, the appropriate relative lengths of exposed fibers 58 may vary according to the configuration of I/O interface 22.

Figure 3B:
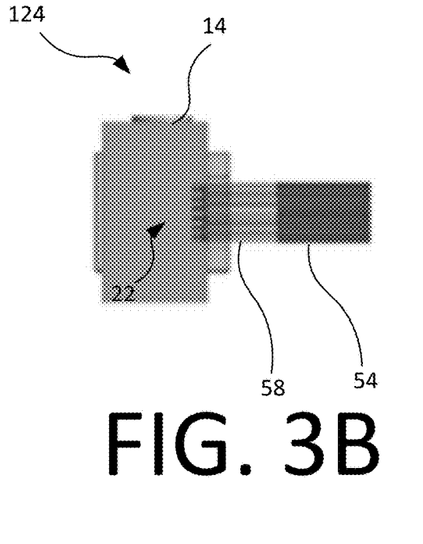
FIG. 3B is a top plan view of optical fibers aligned over the PIC of FIG. 1A.

FIG. 3B illustrates an aligning step 124 in which exposed fibers 58 are coarsely aligned with their respective V-grooves 26 in I/O interface 22 of PIC 14. Aligning step 124 is performed after cleaving step 120 and may be performed before, during, or after either or both of supporting step 114 and picking step 118. Aligning step 124 is optional because cable 50 may be placed over I/O interface 22 before cleaving step 120, and the cleaving step may be performed while the cable is held stationary such that the resulting exposed fibers 58 are in coarse alignment with their respective V-grooves 26.

Figure 3C:
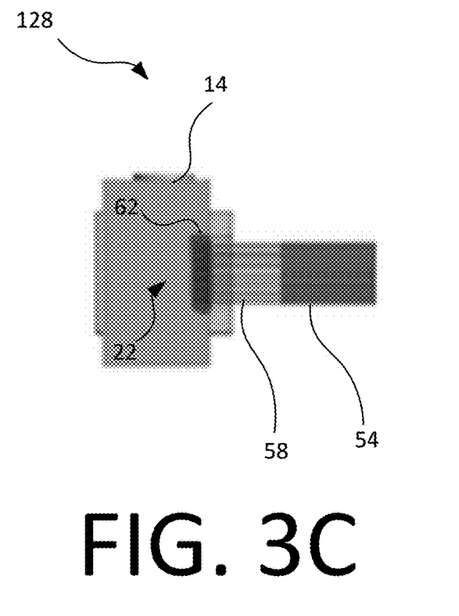
FIG. 3C is a top plan view of the arrangement of FIG. 3B with adhesive applied thereto.

In an adhering step 128 illustrated in FIG. 3C, adhesive 62 is applied to either or both of I/O interface 22 and the free ends of exposed fibers 58. Adhesive 62 may be any flowable adhesive capable of fixing exposed fibers 58 to PIC 14, such as, for example, an epoxy. In some examples, adhesive 62 is a light- or electromagnetic wave-curable epoxy. In the illustrated example, adhering step 128 is shown to include applying adhesive 62 to both exposed fibers 58 and I/O interface 22 after aligning step 124, but adhering step 128 may be performed before, during, or after any one or any combination of supporting step 114, picking step 118, and the sequential steps of cleaving and aligning 120, 124. If adhering step 128 is performed before cleaving step 120, adhesive 62 applied to I/O interface, but not to exposed fibers 58.

Figure 3D:
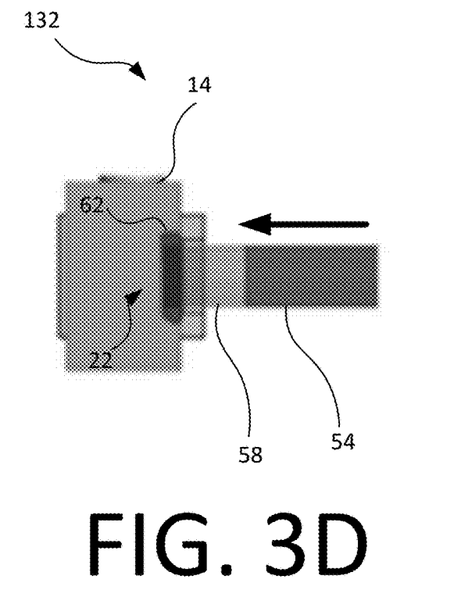
FIG. 3D is a top plan view of the arrangement of FIG. 3B with fibers advanced further over the PIC.

FIG. 3D illustrates an optional advancing step 132 wherein exposed fibers 58 are advanced toward the ends of their respective V-grooves 26 and fine alignments between the fibers and V-grooves may be made after adhering step 128. Advancing step 132 may be omitted if exposed fibers 58 are already aligned with their respective V-grooves 26 at the end of adhering step 128 sufficiently that a pressing step 136, detailed below, will result in effective optical coupling between cable 50 and PIC 14.

Figure 4:
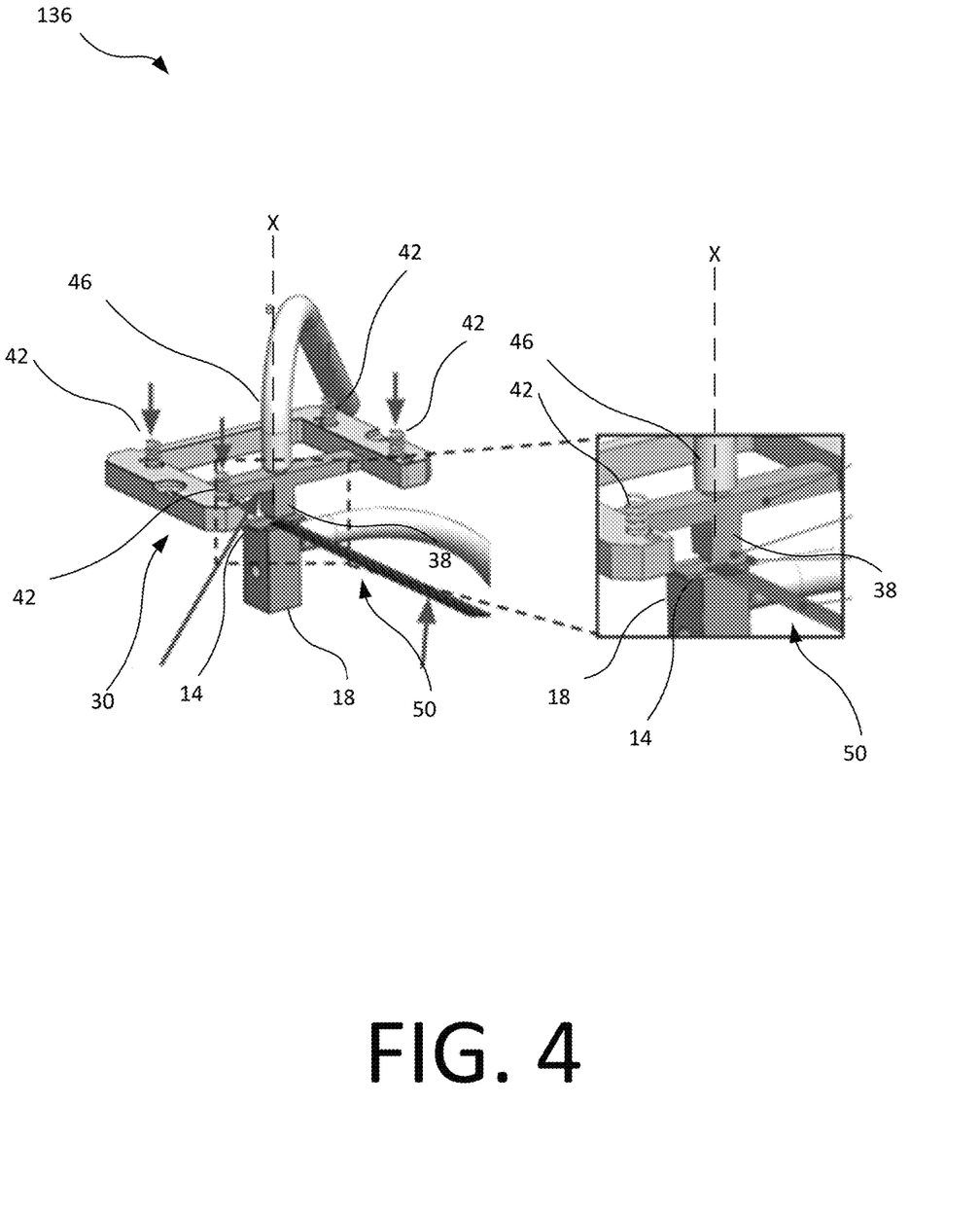
FIG. 4 is an oblique perspective view of the output frame of FIG. 2B pressing down on the arrangement of FIG. 3D.

FIG. 4 illustrates pressing step 136. Pressing step 136 is performed after supporting step 114, picking step 118, cleaving step 120, and adhering step 128. Pressing step 136 is also performed after whichever one or combination of aligning step 124 and advancing step 132 are performed. Thus, at the start of pressing step 136, PIC 14 is supported by support 18, lid 34 is picked up by tip 38, cable 50 is cleaved, exposed fibers 58 are sufficiently aligned with their respective V-grooves 26, either or both of the exposed fibers and the V-grooves have adhesive 62 applied thereon, and the lid and tip are aligned over the exposed fibers and I/O interface. During pressing step 136, downward force is applied to the biasing arrangement coupled to output frame 30, meaning springs 42 in the illustrated example, to drive lid 34 downward along force axis X and toward an intended final or permanent location of the lid on PIC 14.

Figure 5A:
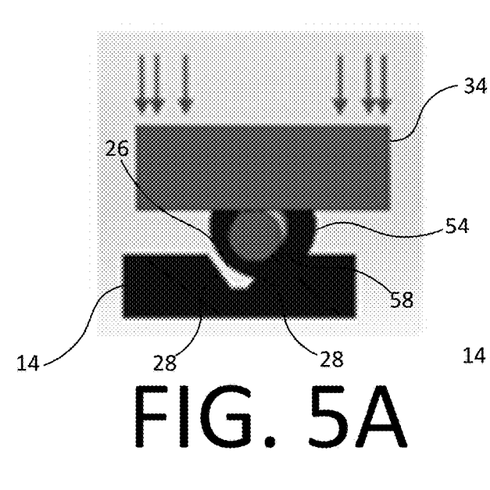
FIGS. 5A-5C are cross-sectional elevation views of the lid of FIG. 2A pressing progressively further down on the arrangement of FIG. 3D.
Figure 5B:
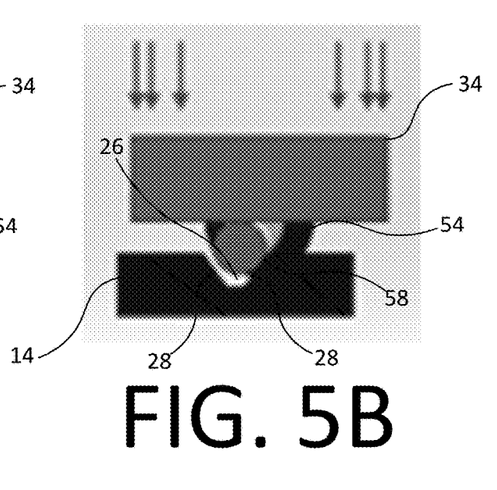
Figure 5C:
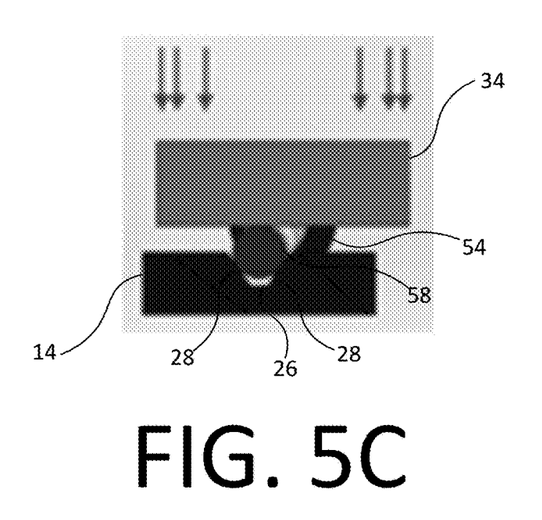

As shown in FIGS. 5A-5C, throughout pressing step 136 lid 34 applies downward force to the free ends of exposed fibers 58. Though lid 34 need not be made of glass, glass is an example of a material of which the lid may be made that would enable the lid to transfer a sufficient amount of force to exposed fibers 58 with little or no damage to the lid resulting. If an exposed fiber 58 is laterally off-center from its respective V-groove 26 at the beginning of pressing step 136 as shown in FIG. 5A, the free end of the fiber will slide along one of the side walls 58 toward the center of the V-groove as the fiber is driven toward the bottom of the V-groove by lid 34 as shown in FIGS. 5B and 5C. Cladding 54 should be cut back far enough to permit exposed fibers 58 to deflect as far as necessary to reach the bottom and center of their respective V-grooves 26.

Figure 6A:
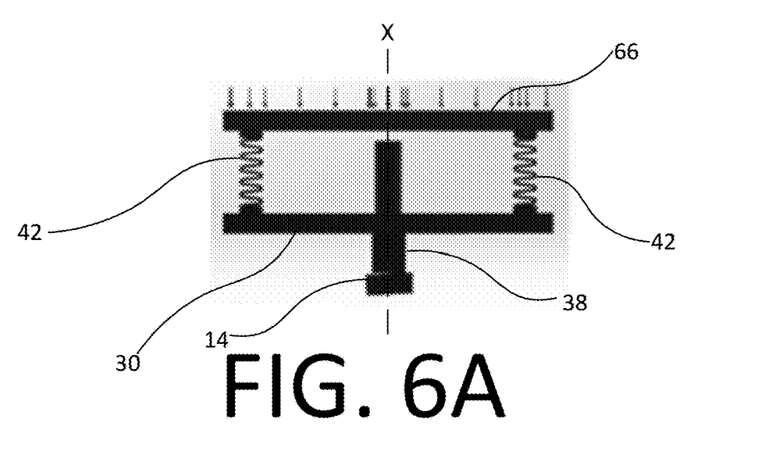
FIGS. 6A-6C are front plan views of a jig pressing down on the PIC of FIG. 1A.
Figure 6B:
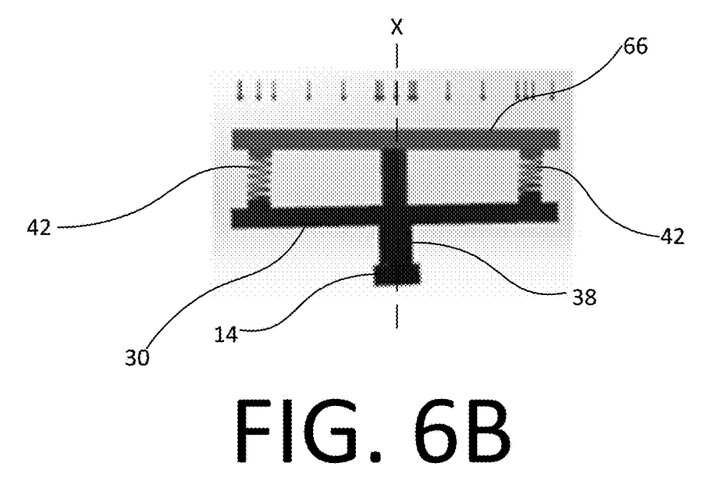
Figure 6C:
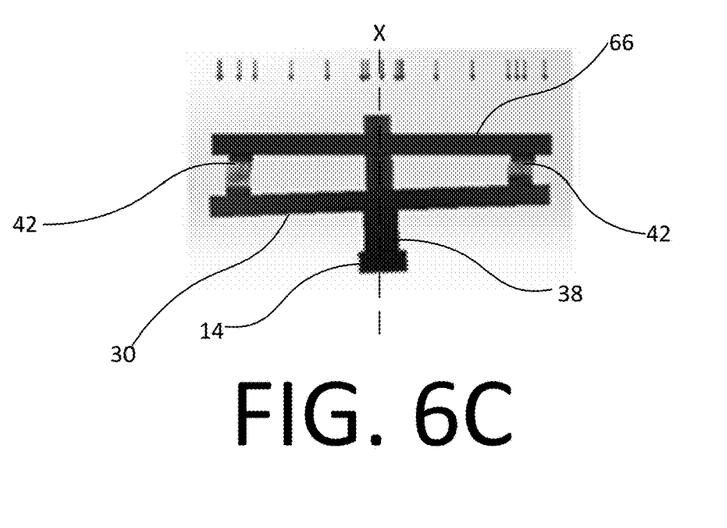

Turning to FIGS. 6A-6C, an input frame 66 is used to apply the downward force to the biasing arrangement, being springs 42 in the illustrated arrangement, during pressing step 136. Input frame 66, the biasing arrangement, and output frame 30 collectively provide a jig. Either or both of input frame 66 and output frame 30 may be connected to a gantry or crane system that can move the jig laterally. The gantry or crane system, or a separate pressing device, may also include an actuator able to apply force to input frame 66 along force axis X to enact pressing step 136.

Assuming input frame 66 is fixed to a rotational position relative to force axis X as shown in FIGS. 6A-6C, the biasing arrangement provided by the springs 42 is balanced in regards to the resilience and placement of the springs to bias output frame 30 relative to the input frame 66 toward a position wherein tip 38 is aligned along the force axis X. Because input frame 66 is coupled to output frame 30 by an elastic biasing arrangement, being the springs 42 in the illustrated example, force along force axis X may be transferred from the input frame to the output frame while the output frame remains able to tilt relative to the force axis and the input frame. Thus, if PIC 14 is supported in an uneven position, such as wherein an upper surface of the PIC does not lie on a plane normal to force axis X as shown in FIGS. 6A-6C, output frame 30 can tilt relative to input frame 66 while downward force is applied to the input frame along the force axis to enable tip 38 to tilt toward extending normally from the upper surface of the PIC. The biasing arrangement may enable output frame 30 to tilt relative to input frame 66 toward any one direction within a range of up to 360° around force axis X. By tilting toward extending normally from the upper surface of PIC 14, tip 38 is able to press on lid 34 (not visible in FIGS. 6A-6C) such that the lid will lie flat on the upper surface of the PIC and distribute adequate pressing force on all exposed fibers 58 to press the exposed fibers into their respective V-grooves 28.

Figure 7:
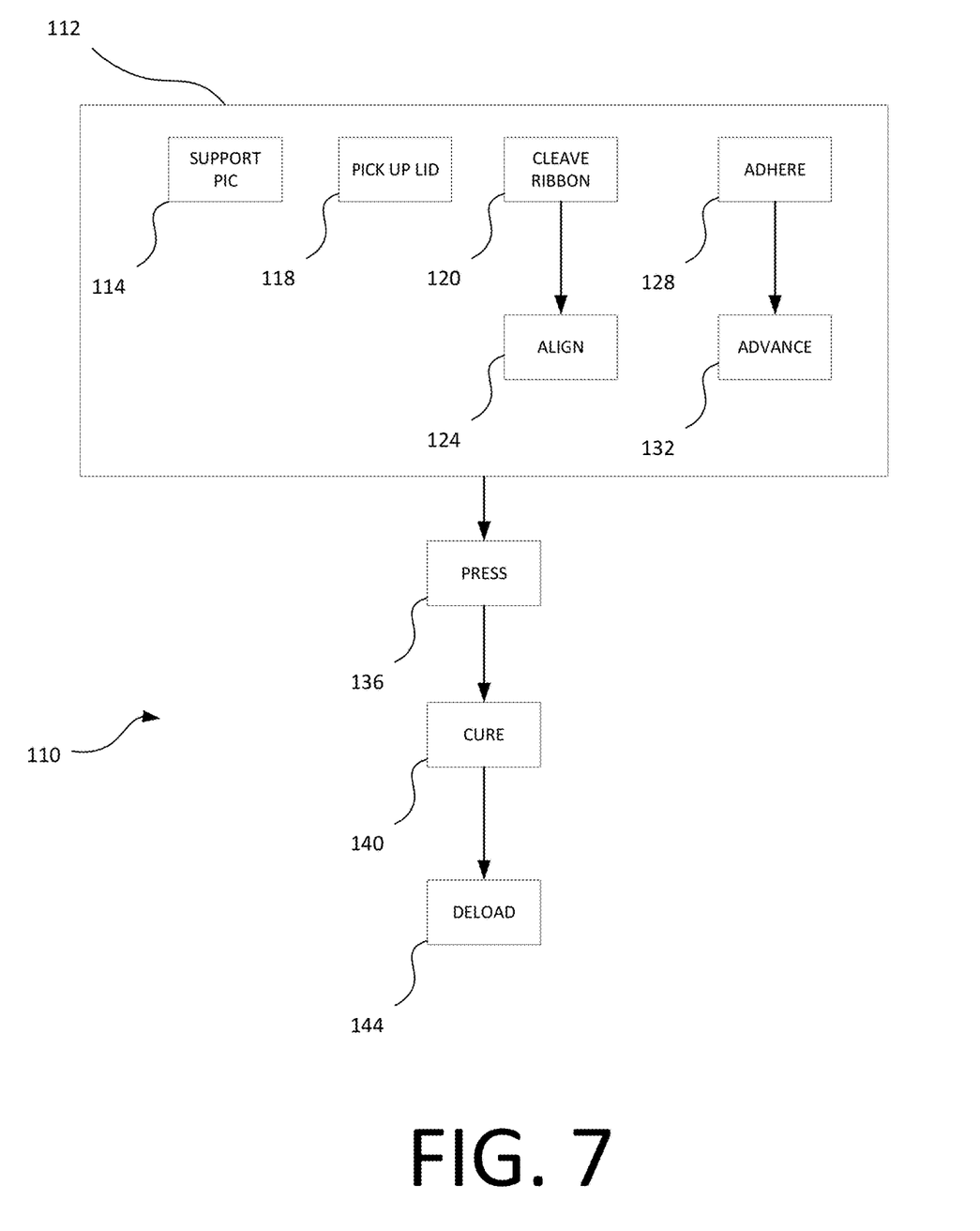
FIG. 7 is a flowchart of a process of assembling a PIC package with the arrangements of FIGS. 1A-6C.

FIG. 7 illustrates a process 110 for coupling cable 50 to PIC 14 according to the forgoing steps and devices. In a set up stage 112, supporting step 114, picking step 118, cleaving step 120, and adhering step 128 as described above are performed in any order. Also as noted above, aligning step 124 and advancing step 132 are optional. However, if performed, aligning step 124 is performed after cleaving step 120, advancing step 132 is performed after adhering step 128. If either or both of aligning step 124 and advancing step 132 are performed, they are performed before the conclusion of set up stage 112. Pressing step 136 is performed after set up stage 112 and continues until exposed fibers 58 reach a satisfactory depth within their respective V-grooves 26.

A curing step 140 occurs after pressing step 136 and while sufficient load remains on lid 34 to keep the lid and exposed fibers 58 in their intended final or permanent locations relative to PIC 14. Curing step 140 includes whatever processes are necessary to set adhesive 62 sufficiently that load may be removed from lid 34 and the lid and exposed fibers 58 will remain in their intended positions. Depending on the type of adhesive 62 used, curing step 140 may include waiting for the adhesive to set over time, applying a catalyst to the adhesive, or curing the adhesive with electromagnetic radiation. In some examples, the electromagnetic radiation may be light, such as visible light or ultraviolet light. If electromagnetic radiation is used to cure adhesive 62, the radiation may be propagated through any of the above described devices. For example, lid 34 may be transparent to the type of radiation used to cure adhesive 62, and the radiation may be shone on the adhesive through the lid. The tip 38, or the entire output frame 30, may also be transparent to the radiation used to cure adhesive 62, and the radiation may be shone on the adhesive through both the tip and lid 34. Alternatively or in addition, the radiation may be shone on adhesive 62 through PIC 14. After curing step 140 is complete, load may be removed from lid 34 in deloading step 144.

Figure 8:
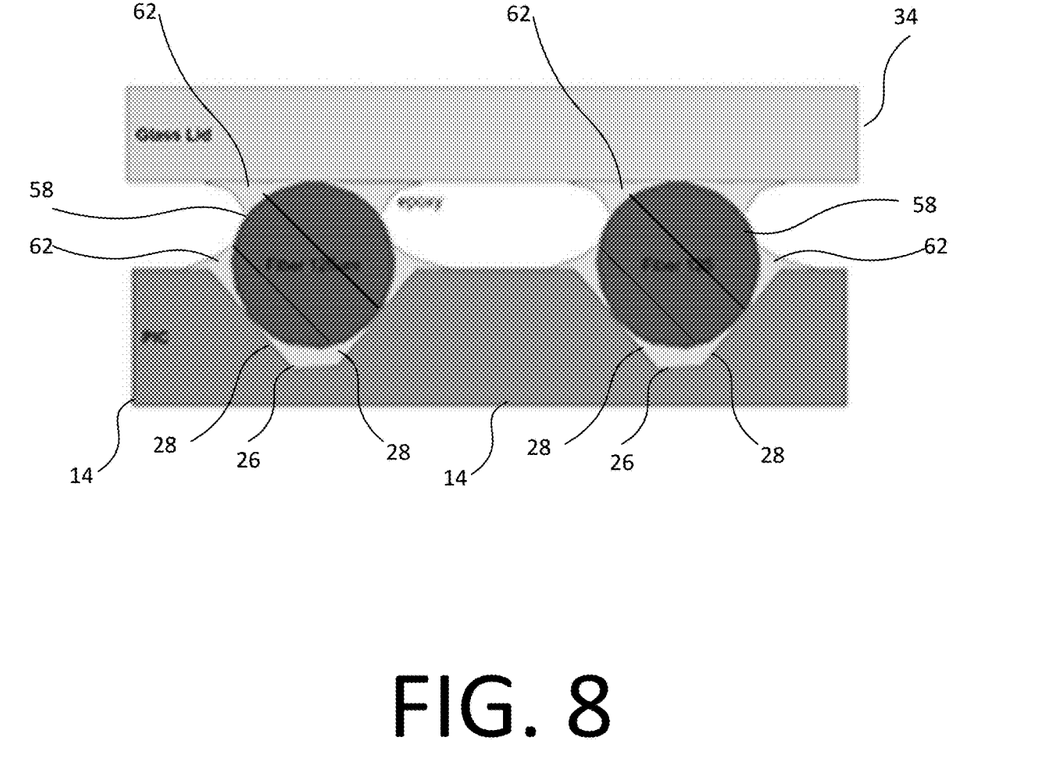
FIG. 8 is a cross-sectional elevation view of a PIC package that may result from the process of FIG. 7.

FIG. 8 shows an example of a portion of a PIC package resulting from completion of process 110. Exposed fibers 58 are each seated within a respective V-groove at a lowest possible location. In the illustrated example, the width of each exposed fiber 58 puts the lowest possible location of the exposed fibers within their respective V-grooves 26 above the bottom of the V-grooves, such that each exposed fiber contacts both side walls 28 of its respective V-groove but does not contact the bottom of its respective V-groove. Cured adhesive 62 adheres lid 38 to exposed fibers 58 and adheres the exposed fibers to sidewalls 28 and PIC 14 as a whole. Lid 14, fibers 58, and PIC 14 are thus permanently connected such that the fibers are optically coupled to their respective V-grooves 26 and the lid protects the fibers.

Although the concept herein has been described with reference to particular examples, it is to be understood that these examples are merely illustrative of the principles and applications of the present concept. It is therefore to be understood that numerous modifications may be made to the illustrative examples and that other arrangements may be devised without departing from the spirit and scope of the present concept as defined by the appended claims.

The invention claimed is:

1. A system for passive alignment of fibers to an interface of a photonic integrated circuit (PIC), the system comprising:
   an input frame;
   an actuator arranged to apply force along a force axis to the input frame; and
   an output frame including a tip configured for picking up a plate and transferring the force thereto, the output frame connected to the input frame such that the output frame is configured to tilt relative to the input frame and the output frame is elastically biased relative to the input frame into a position wherein the tip is aligned on the force axis.

2. The system of claim 1, including a vacuum assembly configured to evacuate air from a tube having an opening at an end of the tip.

3. The system of claim 1, including a spring connecting the input frame to the output frame.

4. The system of claim 1, including a plurality of springs connecting the input frame to the output frame, wherein each spring is positioned at a different respective position about the force axis.

5. The system of claim 4, wherein the plurality of springs is balanced with regard to resilience and placement of each spring such that the bias between the input frame and output frame is symmetrical about the force axis.

6. The system of claim 4, wherein each spring of the plurality of springs is located at an equal radial distance from the force axis and an equal angular distance on either side from each circumferentially adjacent spring.

7. The system of claim 4, wherein the plurality of springs is four springs, each of the four springs defining a corner of a square arrangement centered on the force axis.

8. The system of claim 1, wherein the tip extends along the force axis.

9. The system of claim 1, wherein the tip is transparent.

10. The system of claim 1, wherein the output frame is free to tilt away from the position wherein the tip is aligned on the force axis in any one direction across a 360° degree range relative to the force axis.

11. The system of claim 1, comprising a gantry carrying the input frame, actuator, and output frame at a movable location.

12. A method of coupling an optical cable to a PIC, the method comprising:
   coarsely aligning exposed fibers of the optical cable with V-grooves of an in-out (I/O) interface of the PIC;
   aligning a plate over the exposed fibers and the I/O interface; and
   applying force along a force axis to a jig, the jig being arranged to transfer the force to the plate, until each of the fibers is seated in a respective V-groove, the jig comprising:
      an input frame to which the force is applied; and
      an output frame including a tip extending therefrom for transferring the force to the plate, the output frame being free to tilt relative to the input frame and resiliently biased relative to the input frame toward a position wherein the tip extends along the force axis of the force and the output frame is spaced relative to the input frame.

13. The method of claim 12, comprising using a vacuum to secure the PIC to a base before the step of applying force along the force axis.

14. The method of claim 12, comprising using a vacuum connected to the tip to pick up the plate.

15. The method of claim 12, comprising applying adhesive to either or both of the I/O interface and the fibers before the step of applying force.

16. The method of claim 15, comprising curing the adhesive with light projected through the plate after each of the fibers is seated in a respective V-groove.

17. The method of claim 16, wherein the light is also projected through the tip.

18. The method of claim 12, wherein the output frame is free to tilt away from the position wherein the tip is aligned on the force axis in any direction across a 360° degree range relative to the force axis.

19. The method of claim 12, wherein the step of aligning the plate includes controlling a gantry to move the jig while the plate is retained by the tip of the jig.

20. The method of claim 12, comprising a cleaving step prior to the coarse alignment step, the cleaving step including providing the exposed fibers by removing cladding from an end of the optical cable until each of the exposed fibers has a length at least five times a length of the V-grooves.

\* \* \* \* \*